(12) United States Patent
Kubota et al.

(10) Patent No.: US 6,922,326 B2
(45) Date of Patent: Jul. 26, 2005

(54) ACCUMULATING ELEMENT MODULE (75) Inventors: Shinya Kubota, Wako (JP); Yoshinori Mita, Wako (JP); Koichi Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 10/719,059

(22) Filed: Nov. 24, 2003

(65) Prior Publication Data

US 2005/0054240 A1 Mar. 10, 2005

(30) Foreign Application Priority Data

Nov. 29, 2002 (JP) ..................................... 2002-348695

(51) Int. Cl.$^7$ ........................... H01G 2/14; H01G 5/38; H01G 9/00
(52) U.S. Cl. ..................... 361/274.1; 361/329; 361/522
(58) Field of Search ............................. 361/272, 274.1, 361/274.2, 274.3, 274.4, 328–329, 522, 541

(56) References Cited

U.S. PATENT DOCUMENTS

| | | | | | |
|---|---|---|---|---|---|
| 3,911,334 | A | * | 10/1975 | Brayshaw et al. | ........ 361/274.1 |
| 4,677,523 | A | * | 6/1987 | Kauppi | ........................ 361/329 |
| 4,912,597 | A | * | 3/1990 | Carpenter et al. | ........... 361/329 |
| 5,530,618 | A | * | 6/1996 | Carroll et al. | ............... 361/329 |
| 2002/0048139 | A1 | * | 4/2002 | Meadows et al. | ............ 361/302 |
| 2003/0133251 | A1 | * | 7/2003 | Kitagawa et al. | ........... 361/328 |

* cited by examiner

*Primary Examiner*—Eric W. Thomas
(74) *Attorney, Agent, or Firm*—Arent Fox PLLC (57) ABSTRACT

An accumulating element module includes a plurality of accumulating elements, each having a positive pole terminal and a negative pole terminal at one end. The accumulating elements are connected together at their other ends by an insulating connecting member made of a synthetic rubber. The insulating connecting member includes a plurality of caps and connectors. A deformation-resistant, band-shaped, temperature sensing member having a plurality of excessively raised temperature detectors is inserted through the caps.

9 Claims, 11 Drawing Sheets

ACCUMULATING ELEMENT MODULE

BACKGROUND OF THE INVENTION

1. Field of the Invention

The present invention relates to an accumulating element module, and particularly to an accumulating element module including a plurality of accumulating elements arranged in a row with their respective axes parallel to one another. Each accumulating element has a cylindrical shape with a positive pole terminal and a negative pole terminal at one end. The accumulating elements are connected at their respective other ends to one another by an insulating connecting member. A temperature detector which detects an extremely high or, excessively raised, temperature is provided in each accumulating element. An electric double-layer capacitor, a secondary battery, and the like are encompassed by the accumulating element.

2. Description of the Related Art

A known insulating connecting member includes a hard plate made of a synthetic resin and a plurality of mounting portions, which include a plurality of retaining pieces disposed circumferentially at a plurality of points on one surface of the hard plate. The other end of each accumulating element is forcibly inserted into a space surrounded by the plurality of retaining pieces of the mounting portions, wherein the accumulating elements are fixed to the insulating connecting member by the restoring forces of the retaining pieces which are due to the elastic deformation of the retaining pieces.

Tape, a special fixing member, and the like have conventionally been used to mount the temperature detector to each accumulating element.

However, if the above-described known insulating connecting member is used, one end of each accumulating element, that is, the end wherein the positive and negative pole terminals are located, is fixed by a bus bar, while the other end is fixed in the same way. Therefore, when the insulating connecting member vibrates, additional and undesirable stress is generated in the accumulating element.

When using tape to employ the conventional method of mounting, the ability to assemble the temperature detector is poor. Also, when the special fixing member is used, manufacturing costs increase and a space occupied by the accumulating element module is enlarged.

SUMMARY OF THE INVENTION

Accordingly, an aspect of the present invention is to provide an accumulating element module, wherein the generation of additional stress in each accumulating element, due to the connection structure of the other end of the accumulating element, is suppressed. Moreover, according to another aspect of the present invention, the ability to assemble each temperature detector is improved. According to yet another aspect of the present invention, any enlargement of the space occupied by the accumulating element module, due to assembling the temperature detectors, is avoided.

To achieve the above aspects, according to the present invention, there is provided an accumulating element module including a plurality of accumulating elements arranged in a row wherein their respective axes are parallel to one another. Each accumulating element has a cylindrical shape with a positive pole terminal and a negative pole terminal at one end. The accumulating elements are connected to one another at their respective other ends by an insulating connecting member. A temperature detector, which detects an extremely high or excessively raised temperature of each accumulating element, is provided in the accumulating element.

The insulating connecting member is formed of an elastic material, and includes a plurality of caps and connectors, each of which connects adjacent caps to each other. Each cap includes a cylindrical portion and an end wall, wherein the cylindrical portion is adhered to an outer peripheral surface of the other end of each accumulating element and is connected to the adjacent cylindrical portion by the connector. The end wall is integral with the cylindrical portion and opposite to a face of the other end of each accumulating element. A deformation-resistant, band-shaped temperature sensing member is inserted through the caps in a direction from the cap located at one end toward the cap located at the other end by passing through a space between inner surfaces of the end walls of the caps and the faces of the other ends of the accumulating elements. The temperature sensing member also passes through the connectors.

The deformation-resistant, band-shaped temperature sensing member includes a plurality of flat, plate-shaped, extremely high or excessively raised temperature detectors to measure temperatures of the accumulating elements at the faces of the other ends. A plurality of first metal plates are secured at opposite ends to the temperature detectors to electrically connect the adjacent temperature detectors to each other.

A second metal plate is secured to an end of the temperature detectors and is located at opposite longitudinal ends of the accumulating element module. An insulating coating layer, which extends from one of the second metal plates to the other second metal plate, covers the second metal plates, the temperature detectors, and the first metal plates.

With the above arrangement, the other ends of the accumulating elements are connected together so they can be moved individually, as well as to suppress the generation of any additional stress in the accumulating elements due to the connection structure of the other ends of the accumulating elements. Also, the single, deformation-resistant, band-shaped temperature sensing member, which is inserted through each of the caps, functions to inhibit the disengagement of the caps from the accumulating elements. Further, the other end of each accumulating element is substantially insulated from adjacent accumulating elements by the adhesion of the cap. Moreover, the caps are connected together by the connectors, so that good workability for adhesion of the caps to the other ends of the accumulating elements is achieved, and the caps are not lost.

Moreover, the temperature detectors are assembled with the accumulating elements by inserting the band-shaped temperature sensing member through the plurality of caps, wherein the ability to assemble the temperature detectors is improved. Additionally, each temperature detector is disposed within each of the caps, wherein the space occupied by the accumulating element module is not enlarged as a result of assembling the temperature detectors.

The above and other aspects, features and advantages of the present invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
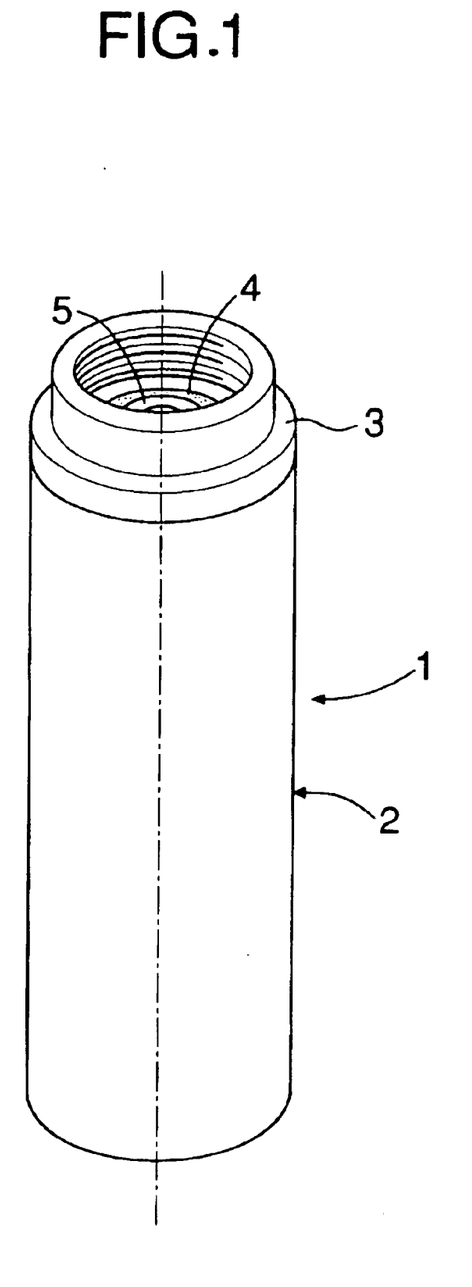
FIG. 1 is a perspective view of an accumulating element.

As shown in FIG. 1, an electric double-layer capacitor accumulating element 1 includes a cylindrical vessel 2 made of aluminum alloy. A positive pole and a negative pole are insulated and cylindrically wound within the vessel 2. A portion of a cylinder 3, which is made of an aluminum alloy, is fitted and welded in an opening provided at one end of the vessel 2. The vessel 2 and the cylinder 3 function as negative pole terminals. A positive pole terminal 5 is retained on an inner peripheral surface of the cylinder 3 on a side of the vessel 2 with an annular insulator 4, which is made of a synthetic resin interposed therebetween.

Figure 2:
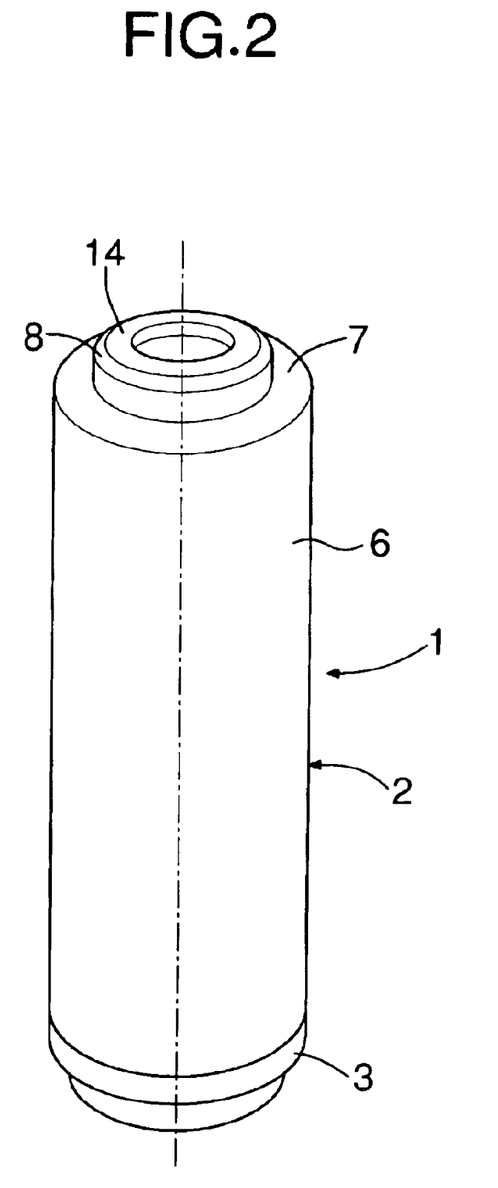
FIG. 2 is a perspective view of an accumulating element inverted from the state shown in FIG. 1.

As shown in FIG. 2, the other end of the vessel 2 is provided with an annular stepped face 7, which faces inward and is connected to a larger-diameter main body 6 of the vessel 2. A smaller-diameter annular projection 8 protrudes from an inner peripheral edge of the annular stepped face 7.

Figure 3:
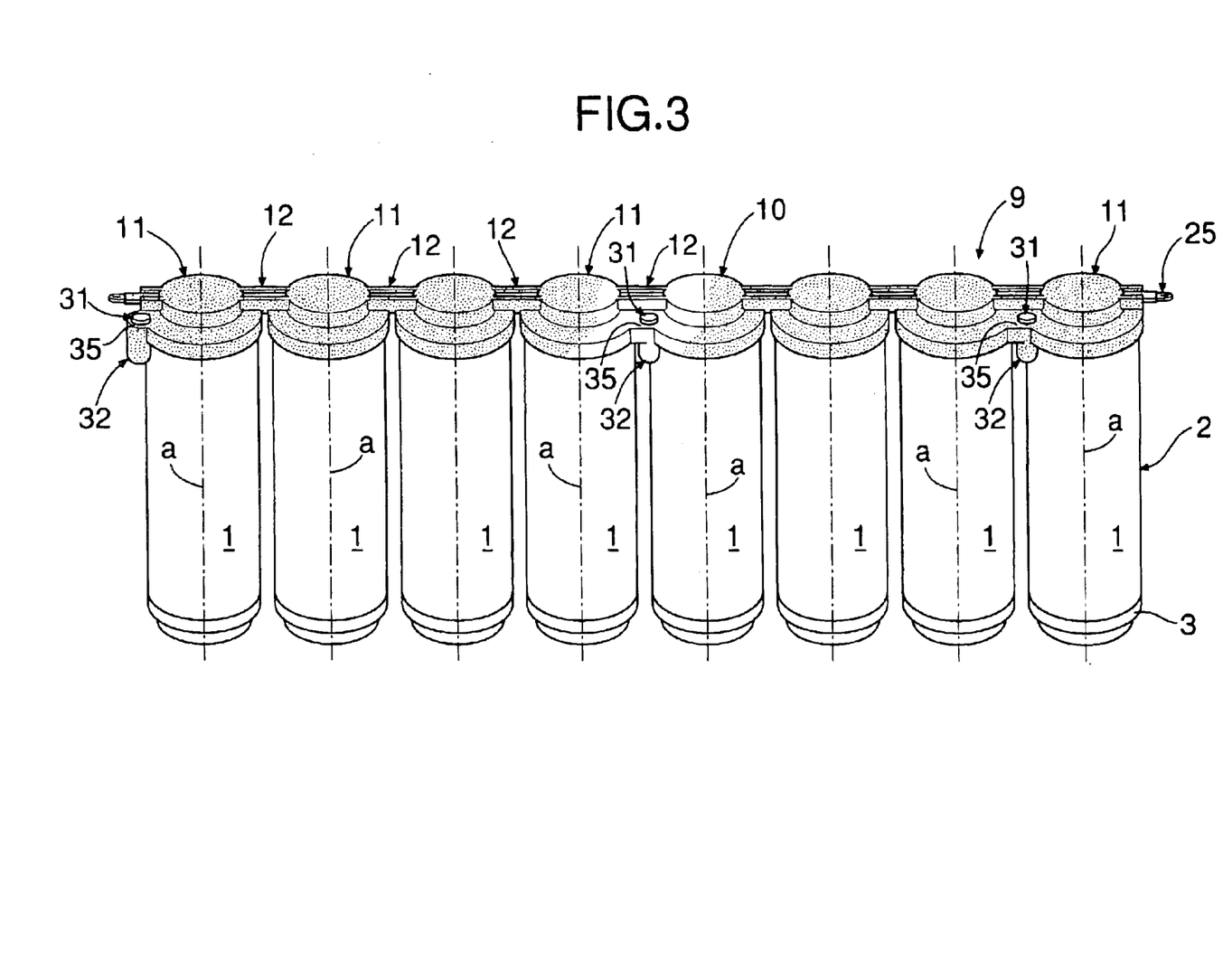
FIG. 3 is a perspective view of an accumulating element module.

As shown in FIG. 3, an accumulating element module 9 includes a plurality of accumulating elements 1, which are arranged in a row wherein their respective axes a are parallel to one another, and the other ends are connected together in a row by an insulating connecting member 10.

Figure 4:
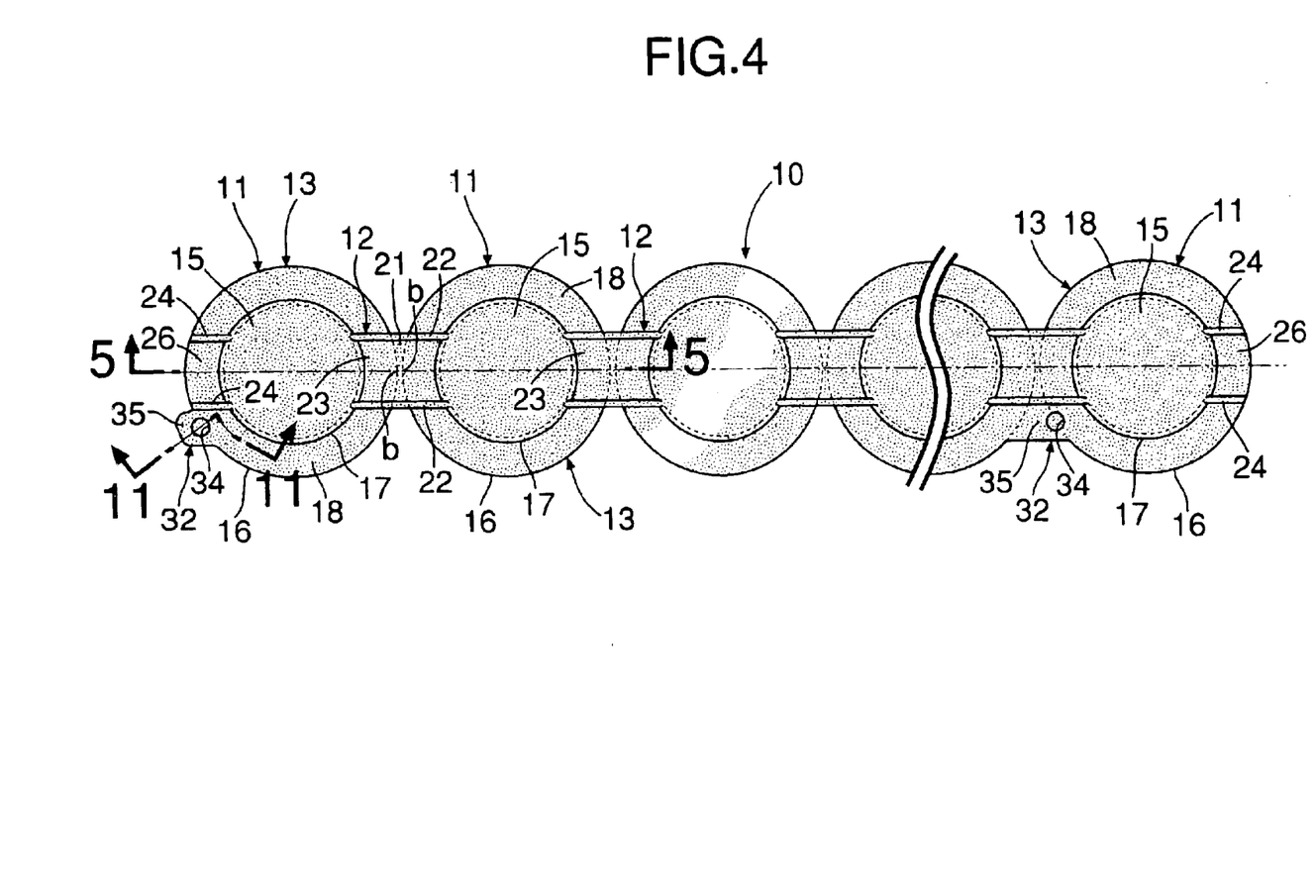
FIG. 4 is a plan view of an insulating connecting member.
Figure 5:
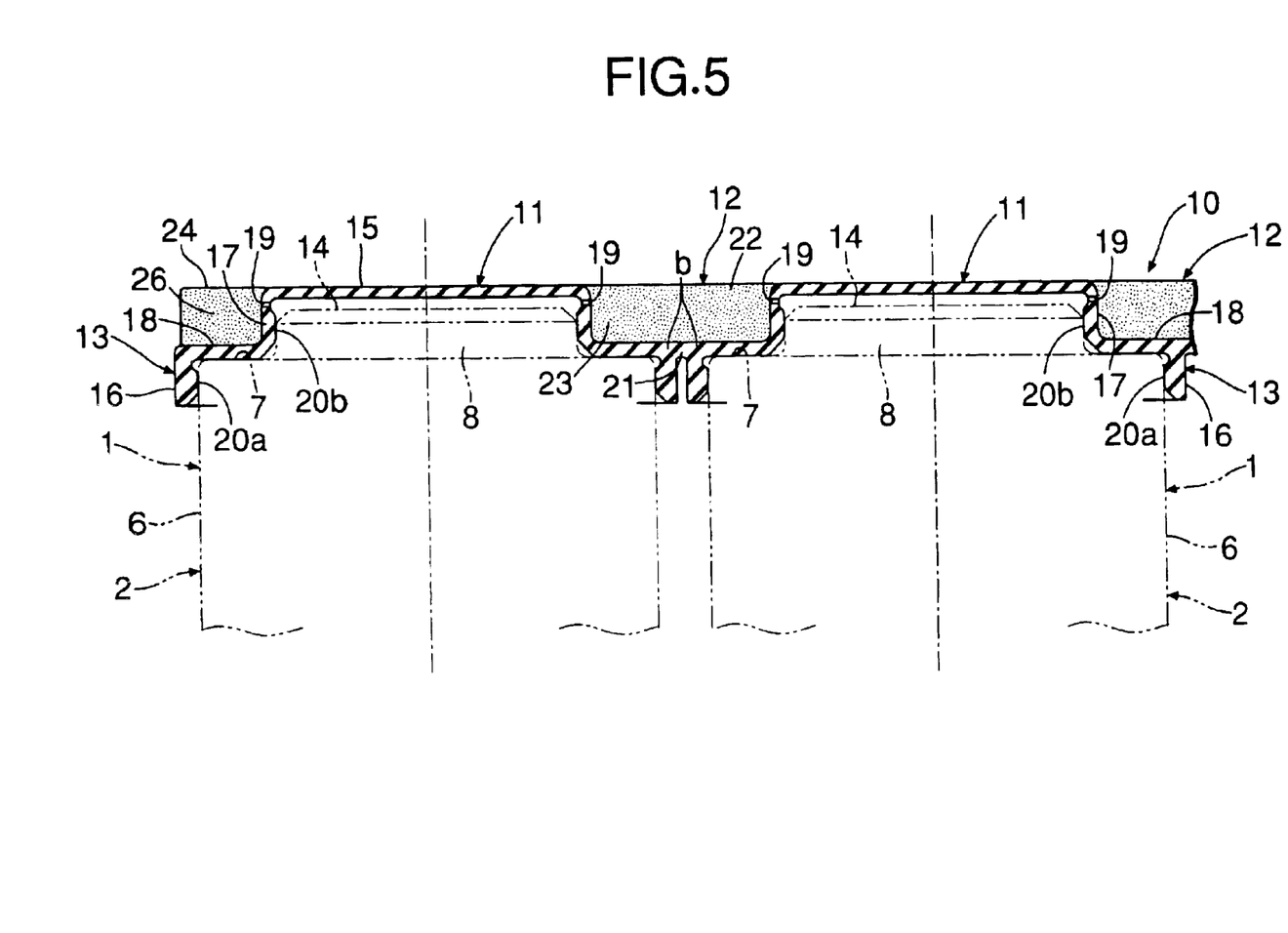
FIG. 5 is an enlarged sectional view taken along a line 5—5 in FIG. 4.

As shown in FIGS. 4 and 5, the insulating connecting member 10 is formed of a synthetic rubber, elastic material, e.g., EPDM, and includes a plurality of caps 11 and connectors 12, each of which connects the adjacent caps 11 to each other. Each cap 11 includes a cylindrical portion 13 adhered to an outer peripheral surface of the other end of each accumulating element 1 and connected to another cylindrical portion 13 of the adjacent cap 11 by the connector 12, and an end wall 15 integral with the cylindrical portion 13 and opposite an end face 14 of the annular projection 8, the end face 14 being a face of the other end of each accumulating element 1.

Each cylindrical portion 13 includes a larger-diameter portion 16 having a projection-shape in vertical section. The larger-diameter portion 16 is adhered to an outer peripheral surface of the larger-diameter main body 6 of the cylindrical vessel 2. A smaller-diameter portion 17 is adhered to an outer peripheral surface of the annular projection 8. An annular portion 18 connecting the portions 16 and 17 to each other is in close contact with the annular stepped face 7. A pair of slits 19 are formed in a side of each smaller-diameter portion 17 that is connected to the end wall 15. The slits 19 are arranged opposite each other in an arrangement direction of the accumulating elements 1. The larger-diameter portion 16 and the smaller-diameter portion 17 have annular beads 20a and 20b provided on their inner peripheral surfaces, which increase an adhesion force thereof to the larger-diameter main body 6 and the annular projection 8.

Each connector 12 includes a first connecting portion 21, which connects ends of adjacent larger-diameter portions 16 over a space between ends b of opposed generatrix of adjacent cylindrical portions 13. The connecting portion 21 lies on the same plane as the annular portion 18. A pair of second connecting portions 22, which are formed to rise from opposite side edges parallel to the arrangement direction of the accumulating elements, connect the smaller-diameter portions 17 and the annular portions 18 to each other. Thus, the first connecting portion 21, portions of the annular portions 18 and the second connecting portions 22 form a groove 23 having a width substantially equal to the length of the slit 19. At opposite ends of each cap 11, a pair of rising portions 24 are connected to the annular portion 18 and the smaller-diameter portion 17, wherein the smaller-diameter 17 is sandwiched therebetween along with the second connecting portions 22.

Figure 6:
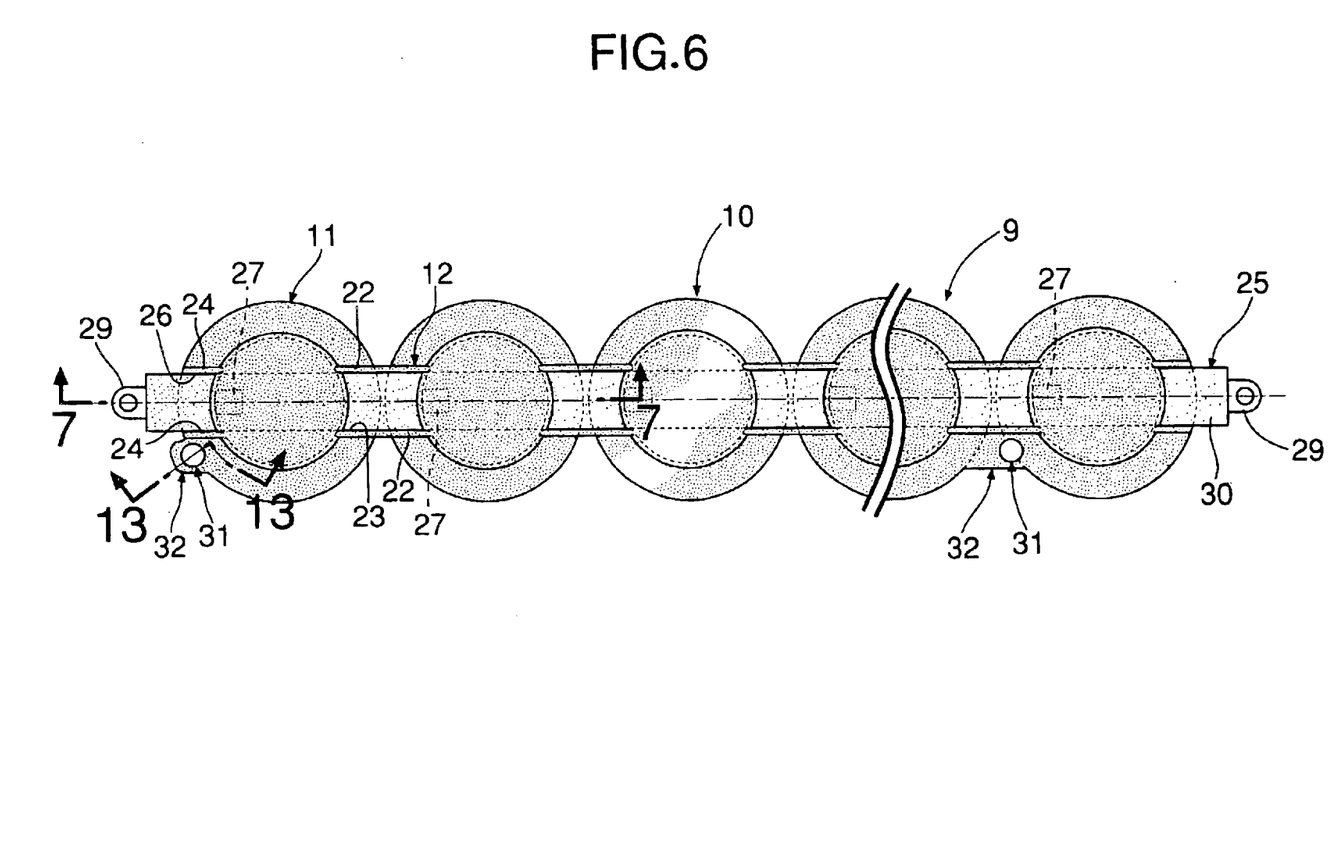
FIG. 6 is a plan view of the accumulating element module.
Figure 7:
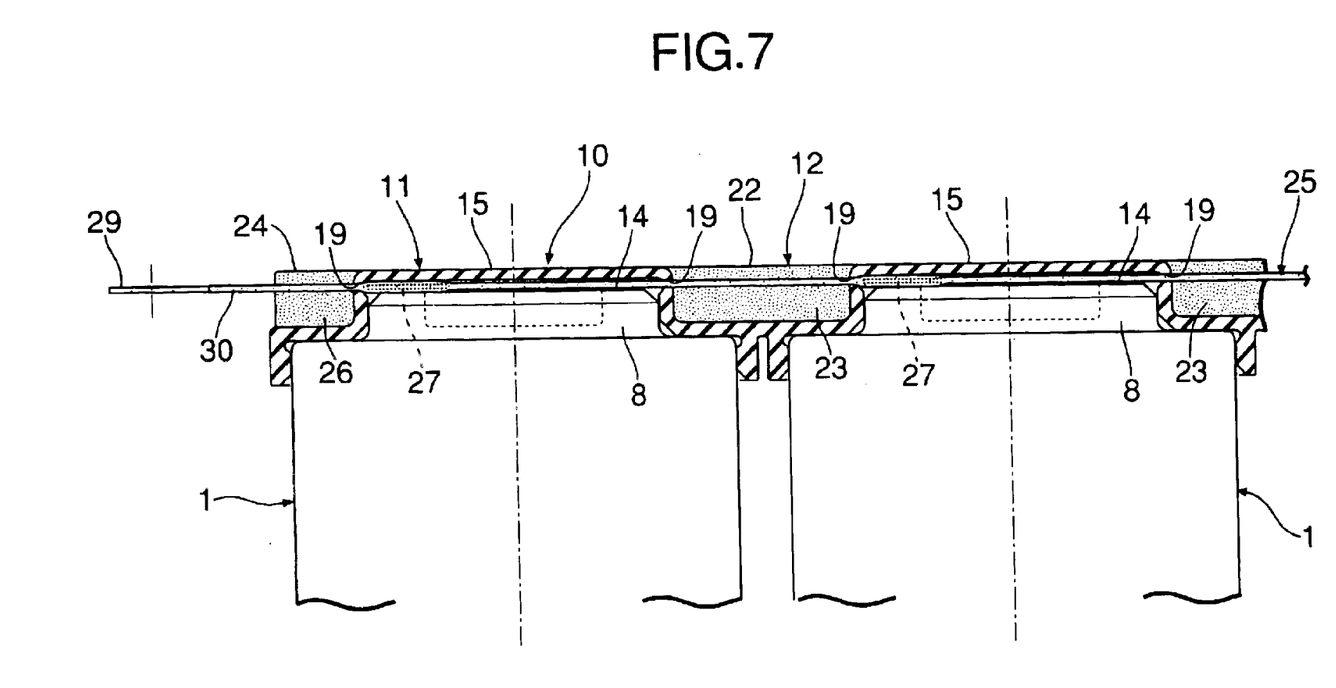
FIG. 7 is an enlarged sectional view taken along a line 7—7 in FIG. 6.

As shown in FIGS. 3, 6 and 7, a single, deformation-resistant, band-shaped temperature sensing member 25 is inserted through the caps 11 from the cap 11 located at one end toward the cap 11 located at the other end. The temperature sensing member 25 passes through the slits 19 in each cap 11, through a space between the inner surfaces of the end walls 15 and the faces of the other ends of the accumulating elements 1, that is, the end faces 14 of the annular projections 18, through the groove 23 in each connector 12, and through a groove 26 between each pair of rising portions 24. Each pair of second connecting portions 22 and each pair of rising portions 24 guide the insertion of the temperature sensing member 25.

Figure 8:
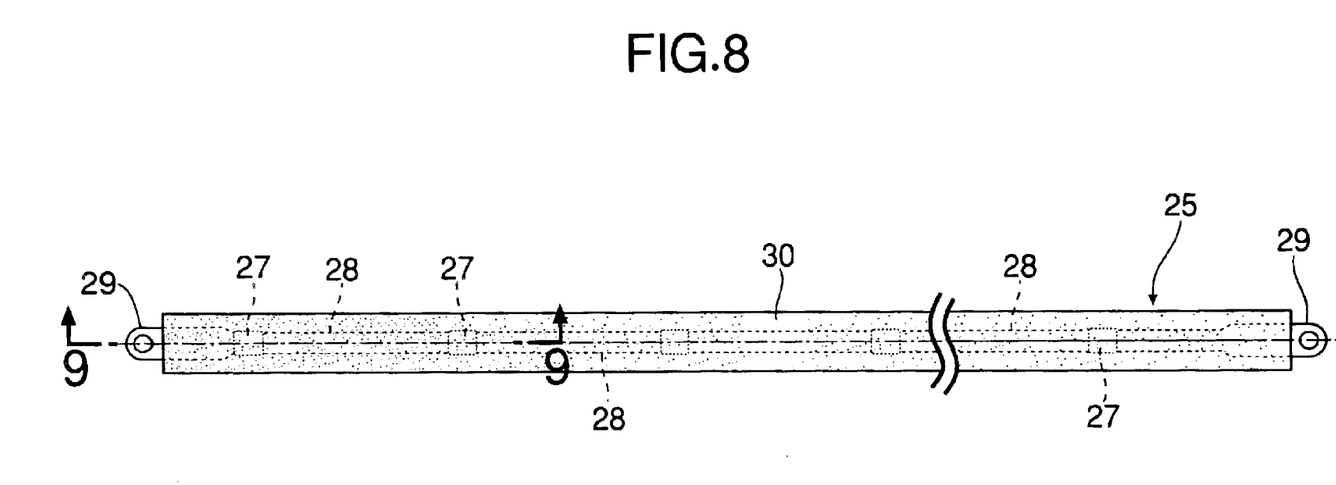
FIG. 8 is a plan view of a deformation-resistant band-shaped temperature sensing member.
Figure 9:
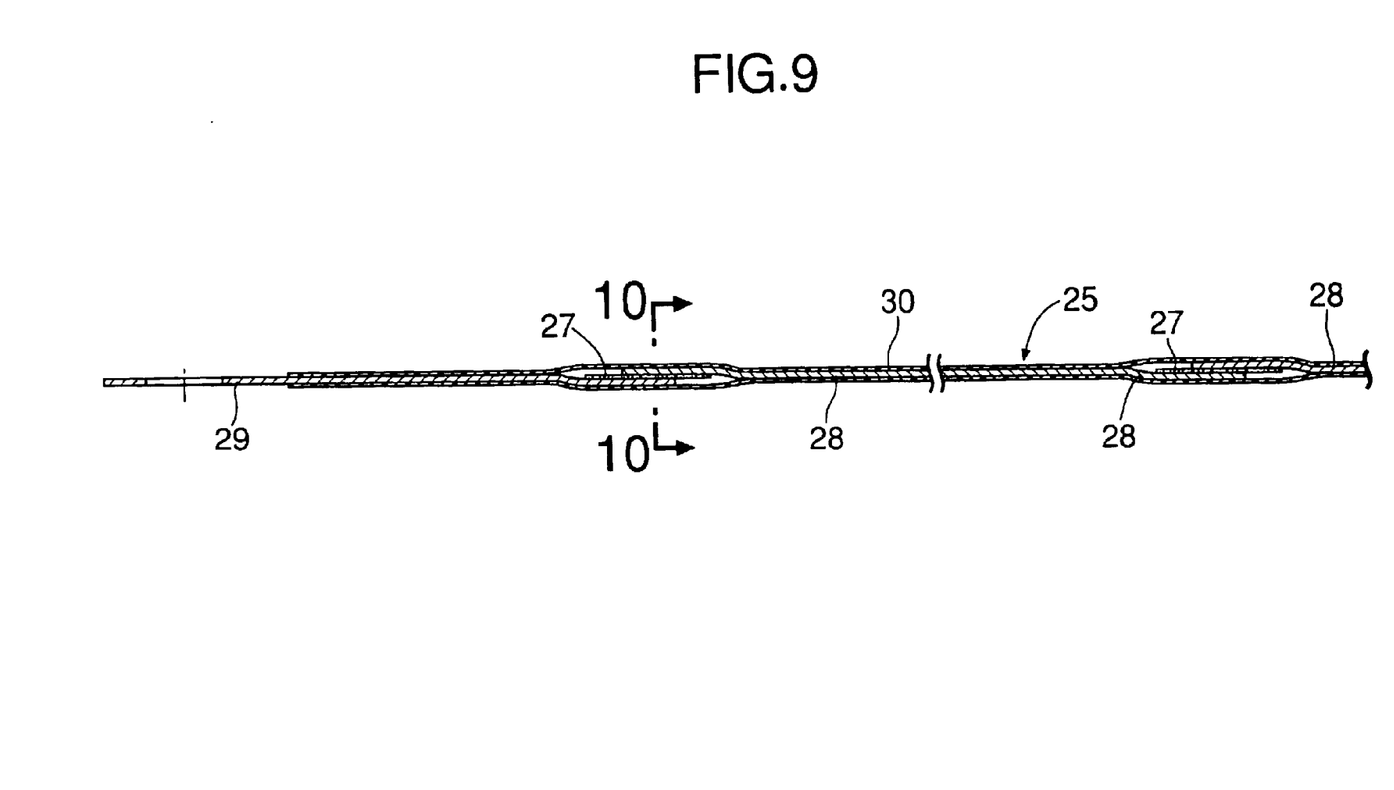
FIG. 9 is a sectional view taken along a line 9—9 in FIG. 8.
Figure 10:
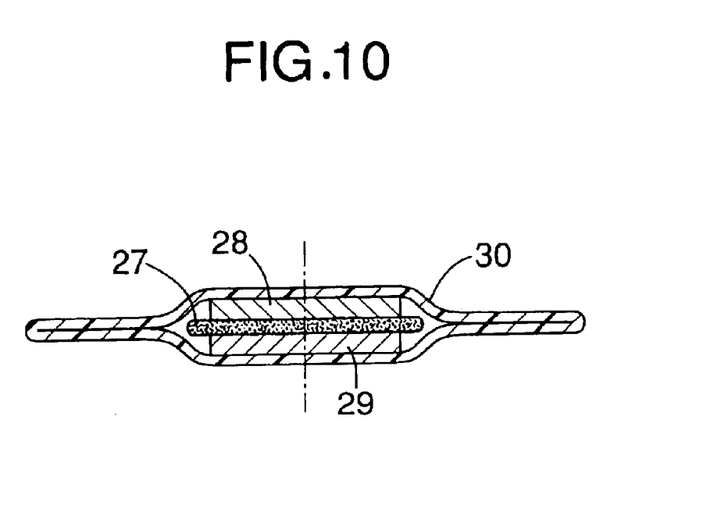
FIG. 10 is a sectional view taken along a line 10—10 in FIG. 9.

As shown in FIGS. 8 to 10, the temperature sensing member 25 includes a plurality of flat, plate-shaped, extremely high or excessively-raised temperature detectors 27, e.g., PTC elements, which measure temperatures of the plurality of accumulating elements 1 at their other ends, namely, at the end faces of the annular projections 8, respectively. A plurality of first metal plates 28 are secured by brazing at their opposite ends to the temperature detectors 27, respectively, and electrically connect the adjacent temperature detectors 27 to each other. A separate second metal plate 29 is secured to a temperature detector 27 at opposite ends of the accumulating element module 9. An insulating coating layer 30 made of a synthetic resin, e.g., polyester, extends from one metal plate 29 to the other metal plate 29, and covers the second metal plates 29, the temperature detectors 27, and the first metal plates 28.

Each temperature detector 27 is mounted to be in close contact with the end face 14 of the annular projection 8 by each cap 11, and is capable of accurately detecting an extremely high or excessively raised temperature of the accumulating element 1.

The plurality of accumulating elements 1 are fixed at their one-ends substantially completely by a bus bar, but connected at the other end so that the accumulating elements 1 can individually be moved. Therefore, it is possible to suppress the generation of additional stress in each accumulating element 1 due to the connection structure of the other ends of the accumulating elements 1. Moreover, the temperature sensing member 25 is inserted through each cap 11, and hence, inhibits the disengagement of each cap 11 from each accumulating element 1.

The other end of each accumulating element 1 is substantially insulated from the adjacent accumulating element 1 by the adhesion of the cap 11. Further, the caps 11 are connected together by connectors, and hence, the workability in adhesion of the caps 11 to the other ends of the accumulating elements 1 is improved, and moreover, the caps 11 cannot be lost.

Also, the temperature detectors 27 can be assembled to the accumulating elements 1 by inserting the temperature sensing member 25 through the caps 11. Accordingly, the ability to assemble the temperature detectors 27 can be improved. Additionally, the temperature detectors 27 are disposed within the caps 11, respectively, and hence, a space occupied by the accumulating element module 9 is not enlarged as a result of assembling the temperature detectors 27.

Figure 11:
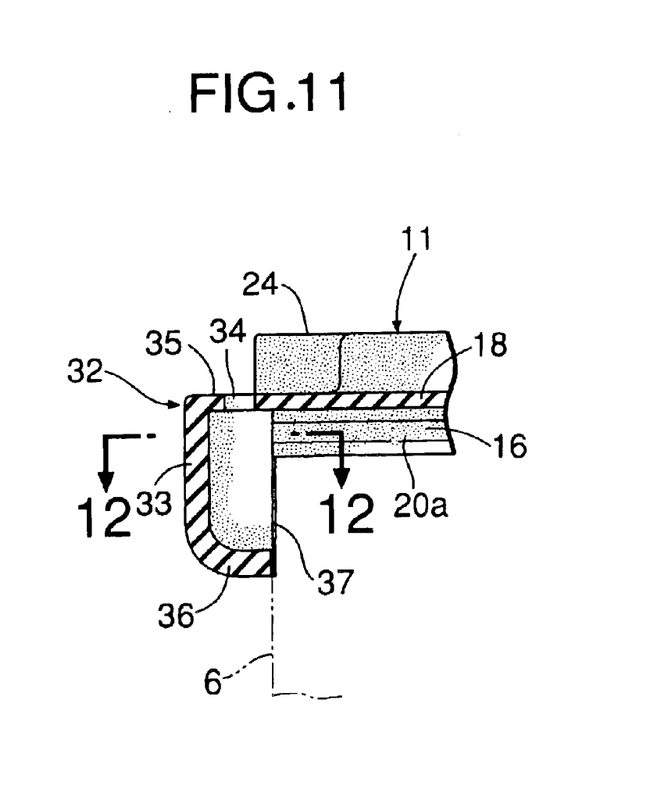
FIG. 11 is a sectional view taken along a line 11—11 in FIG. 4.
Figure 12:
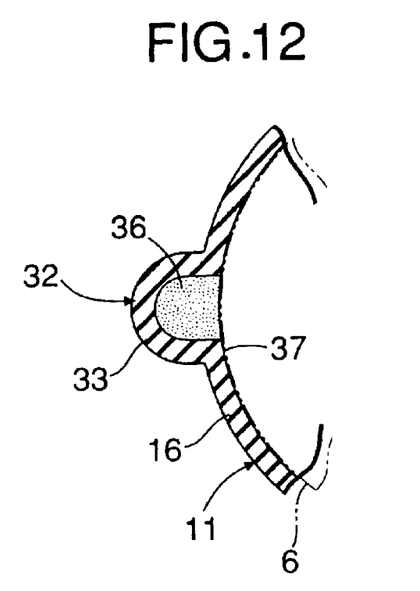
FIG. 12 is a sectional view taken along a line 12—12 in FIG. 11.

As shown in FIG. 3, temperature-sensing elements 31, e.g., thermistors, are retained by holders 32 in the caps 11 located at opposite ends and in the middle, respectively. As shown in FIGS. 11 and 12, each holder 32 includes a channel-shaped section 33 having a portion formed by bulging, in part, the larger-diameter portion 16 radially outwards over an entire length in a generatrix, and a portion extending in the generatrix from an end of the portion formed by the bulging. One end of the channel-shaped section 33 protrudes radially outwards from the annular portion 18 and is closed by an end wall 35 having a through-bore 34. The other end of the channel-shaped section 33 is also closed by an end wall 36. As shown in FIG. 4, the end walls 35 located at one end and in the middle are connected to the adjacent caps 11, respectively. A U-shaped open end face 37 of the holder 32 is adapted to come into close contact with the outer peripheral surface of the larger-diameter main body 6.

Figure 13:
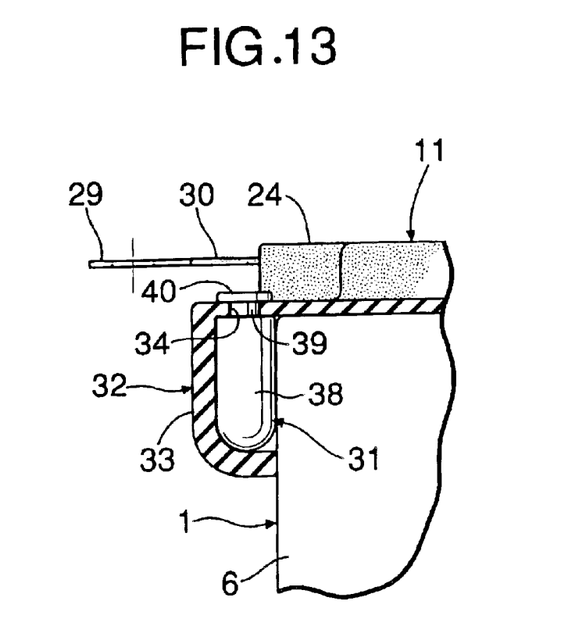
FIG. 13 is a sectional view taken along a line 13—13 in FIG. 6.

As shown in FIG. 13, a cylindrical temperature-sensing portion 38 of the temperature-sensing element 31 is retained within the channel-shaped section 33 with a portion of an outer peripheral surface being in close contact with the outer peripheral surface of the larger-diameter main body 6. The cylindrical temperature-sensing portion 38 has an annular end face in close contact with an inner edge of the through-bore 34. Further, a constriction 39 connected to the temperature-sensing portion 38 is fitted into the through-bore 34,. A disk-shaped connection 40 integral with the constriction 39 is in close contact with an outer edge of the through-bore 34. A lead wire (not shown) is connected to the connection 40, and a temperature of the larger-diameter main body 6, namely, the accumulating element 1 measured by the temperature-sensing portion 38, is informed through the lead wire.

When the temperature sensing member 25 is inserted, the guiding of the insertion is conducted by the pairs of second connecting portions 22, and hence, the pair of rising portions 24 on each cap 11 at opposite ends are not required. Alternatively, free ends of the second connecting portions 22 may be connected to each other by a third connecting portion, wherein the groove 23 can be formed as a bore having a quadrilateral shape in section to minimize the exposure of the temperature sensing member 25.

Although a preferred embodiment of the present invention has been described in detail, it will be understood that the present invention is not limited to the above-described embodiment, and various modifications may be made without departing from the spirit and scope of the invention defined in the claims.

What is claimed is:

1. An accumulating element module comprising:
    a plurality of accumulating elements arranged in a row, wherein longitudinal axes of each accumulating element are parallel to one another, wherein each accumulating element is cylindrical;
    a positive pole terminal and a negative pole terminal are provided at a first end of each accumulating element;
    an elastic insulating connecting member which connects second ends of accumulating elements to one another;
    a temperature detector which detects a relatively high temperature of each accumulating element is provided in each accumulating element,
    wherein the insulating connecting member includes a plurality of caps and connectors,
    wherein each connector connects adjacent caps to each other,
    wherein each cap includes a cylindrical portion and an end wall, the cylindrical portion being adhered to an outer peripheral surface of the second end of each accumulating element and connected to an adjacent cylindrical portion by one of the plurality of connectors, the end wall being integral with the cylindrical portion and opposite to a face of the second end of each accumulating element; and
    a deformation-resistant, band-shaped, temperature sensing member is inserted through each of the caps from a first cap of the plurality of caps located at a first end of the accumulating module toward a final cap of the plurality of caps located at a second end of the accumulating module opposite the first end, and passed through a space between inner surfaces of the end walls of the caps and the faces of the second ends of the accumulating elements and through the connectors, and
    wherein the temperature sensing member includes:
        a plurality of the temperature detectors each disposed at the face of the second end of each accumulating element;
        a plurality of first metal plates secured at opposite ends to adjacent temperature detectors and electrically connecting adjacent temperature detectors to each other;
        two pulling-out second metal plates each secured at one end to each temperature detector located at the first and second ends of the accumulating element module; and
        an insulating coating layer extending from one of the second metal plates to the other second metal plate covers both the second metal plates, the temperature detectors, and the first metal plates.

2. The accumulating element module according to claim 1, wherein each cap includes a pair of opposing slits formed therein through which the temperature sensing member passes.

3. The accumulating element module according to claim 1, wherein each connector includes a first connecting portion which connects ends of adjacent large diameter portions of cylindrical portions of respectively adjacent caps.

4. The accumulating element module according to claim 3, wherein each accumulating element further comprises a small diameter annular projection protruding from an inner peripheral edge of an annular stepped face.

5. The accumulating element module according to claim 4, wherein an annular portion connects the small and large diameter portions.

6. The accumulating element module according to claim 5, wherein the first connecting portion and annular portion lie on a common plane.

7. The accumulating element module according to claim 6, wherein a pair of second connecting portions connect the first connecting portion and annular portion.

8. The accumulating element module according to claim 7, wherein the first connecting portion, portions of the annular portion, and the second portion define a groove.

9. The accumulating element module according to claim 7, wherein each cap includes a pair of opposing slits formed therein through which the temperature sensing member passes, wherein the groove has a width equal to a length of each slit.

* * * * *